(12) United States Patent
Yabe et al.

(10) Patent No.: US 7,870,572 B2
(45) Date of Patent: Jan. 11, 2011

(54) OBJECTIVE LENS DRIVING APPARATUS, ASSEMBLING METHOD THEREOF AND OPTICAL HEAD

(75) Inventors: Mitoru Yabe, Tokyo (JP); Keiji Nakamura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 931 days.

(21) Appl. No.: 11/666,068

(22) PCT Filed: Aug. 31, 2005

(86) PCT No.: PCT/JP2005/015840
§ 371 (c)(1),
(2), (4) Date: Apr. 23, 2007

(87) PCT Pub. No.: WO2006/073011
PCT Pub. Date: Jul. 13, 2006

(65) Prior Publication Data
US 2008/0104622 A1 May 1, 2008

(30) Foreign Application Priority Data
Jan. 5, 2005 (JP) .......................... 2005-000864

(51) Int. Cl.
*G11B 7/09* (2006.01)
(52) U.S. Cl. ..................................... 720/683
(58) Field of Classification Search ................ 720/683, 720/682, 681; 369/44.15, 44.22, 244.1
See application file for complete search history.

(56) References Cited

U.S. PATENT DOCUMENTS

| | | | | |
|---|---|---|---|---|
| 5,136,558 A | * | 8/1992 | Getreuer et al. | 369/44.15 |
| 5,140,471 A | * | 8/1992 | Kasahara | 359/824 |
| 5,289,445 A | * | 2/1994 | Luecke | 369/44.15 |
| 5,442,606 A | * | 8/1995 | McCaslin et al. | 369/44.15 |
| 5,708,633 A | * | 1/1998 | Hollen et al. | 369/44.11 |
| 6,532,199 B1 | * | 3/2003 | Getreuer et al. | 369/44.14 |
| 7,305,688 B2 | * | 12/2007 | Yang et al. | 720/683 |
| 2003/0156529 A1 | * | 8/2003 | Tajiri | 369/244 |
| 2005/0041540 A1 | * | 2/2005 | Tanaka | 369/44.15 |

FOREIGN PATENT DOCUMENTS

| | | |
|---|---|---|
| JP | 62-11228 U | 1/1987 |
| JP | 10-198975 A | 7/1998 |

(Continued)

*Primary Examiner*—Angel A. Castro
(74) *Attorney, Agent, or Firm*—Birch, Stewart, Kolasch and Birch, LLP

(57) ABSTRACT

An object lens driving apparatus (100) includes a lens holder (4) that holds an object lens (1) facing a recording medium and is so supported that the lens holder (4) is movable toward and away from the surface of the recording medium. A focusing coil (5) is fixed in the interior of the lens holder (4) so that the focusing coil (5) surrounds an optical axis of the object lens (1). By apply current to the focusing coil (5), a driving force is generated, which moves the lens holder (4) toward and away from the surface of the recording medium. By disposing the focusing coil (5) in the interior of the lens holder (4) so that the focusing coil (5) surrounds the optical axis of the object lens (1), a movable part of the object lens driving apparatus (100) can be reduced in size and weight, so that a high sensitivity can be accomplished.

11 Claims, 11 Drawing Sheets

FOREIGN PATENT DOCUMENTS

| | | |
|---|---|---|
| JP | 2003-6896 A | 1/2003 |
| JP | 2003-173556 A | 6/2003 |
| JP | 2003-173557 A | 6/2003 |
| JP | 2004-265480 A | 9/2004 |
| JP | 2004-319006 A | 11/2004 |

* cited by examiner

US 7,870,572 B2

OBJECTIVE LENS DRIVING APPARATUS, ASSEMBLING METHOD THEREOF AND OPTICAL HEAD

TECHNICAL FIELD

This invention relates to an optical head used in, for example, a disk device, and relates to an object lens driving apparatus for controlling the driving of an object lens mounted on the optical head and an assembling method thereof.

BACKGROUND ART

An object lens driving apparatus used in a conventional optical head includes a lens holder supported by a plurality of resilient bodies, an object lens fixed in the vicinity of the center of the lens holder, and a focusing coil wound around the periphery of the lens holder. As a winding method of the focusing coil, there are known a method (i.e., direct winding) in which the focusing coil is directly wound around the lens holder and is fixed to the lens holder, and a method in which the focusing coil previously formed to be wound in a shape larger than the lens holder is fit to the outside of the lens holder in the direction of the optical axis of the object lens, and is fixed to the lens holder by adhesion (see, for example, Patent Documents 1 through 4).

Patent Document 1: Japanese Laid-Open Patent Publication No. 2003-173556 (FIG. 1).

Patent Document 2: Japanese Laid-Open Patent Publication No. 2003-173557 (FIG. 1).

Patent Document 3: Japanese Laid-Open Patent Publication No. 2004-265480 (FIG. 1).

Patent Document 4: Japanese Laid-Open Patent Publication No. 2004-319006 (FIG. 8).

DISCLOSURE OF INVENTION

Problems to be Solved by the Invention

However, in the object lens driving apparatus of the type in which the focusing coil is directly wound around the lens holder, it is necessary to use an expensive and exclusive direct coil-winding machine according to the shape of the lens holder. Further, the small lens holders need to be put to the right positions in the direct coil-winding machine one by one, and taken out of the direct coil-winding machine after the winding. Therefore, there is a problem in that productivity is low and a cost is high. Further, in the object lens driving apparatus of the type in which the previously formed focusing coil is fitted to the outside of the lens holder and is fixed by the adhesion, the focusing coil can be efficiently manufactured (separately from the lens holder) using a general-purpose winding machine. However, the focusing coil needs to be designed to a size larger than the outer periphery of the lens holder for allowing the focusing coil to be fit to the lens holder, and therefore it is difficult to reduce the size and weight of the movable part, which prevents the enhancement of sensitivity of the object lens driving apparatus.

The present invention is intended to solve the above described problems, and an object of the present invention is to provide a small and highly-sensitive object lens driving apparatus in which an expensive and exclusive coil winding machine is not required.

Means to Solve the Problems

An object lens driving apparatus according to the present invention includes a lens holder supported so that the lens holder is movable toward and away from a surface of a recording medium and holding the object lens so that the object lens faces the surface of the recording medium, and a focusing coil fixed in the interior of the lens holder so that the focusing coil surrounds the optical axis of the object lens. The focusing coil is for generating a driving force for moving the lens holder toward and away from the surface of the recording medium.

EFFECT OF THE INVENTION

According to the present invention, the focusing coil is fixed in the interior of the lens holder so that the focusing coil surrounds the optical axis of the object lens, and therefore the focusing coil can be downsized. Therefore, a smaller, lightweight and highly-sensitive object lens driving apparatus can be obtained.

DESCRIPTION OF REFERENCE MARKS

1 . . . object lens, 2 . . . light flux, 3 . . . disk recording medium, 4 . . . lens holder, 4b . . . aperture portion, 4c . . .

opening, 4*d* . . . focusing coil positioning wall, 4*e* . . . projection, 5 . . . focusing coil, 10*a*, 10*b* . . . magnet, 8*a*-8*f* . . . wire.

BEST MODE FOR CARRYING OUT THE INVENTION

Figure 1:
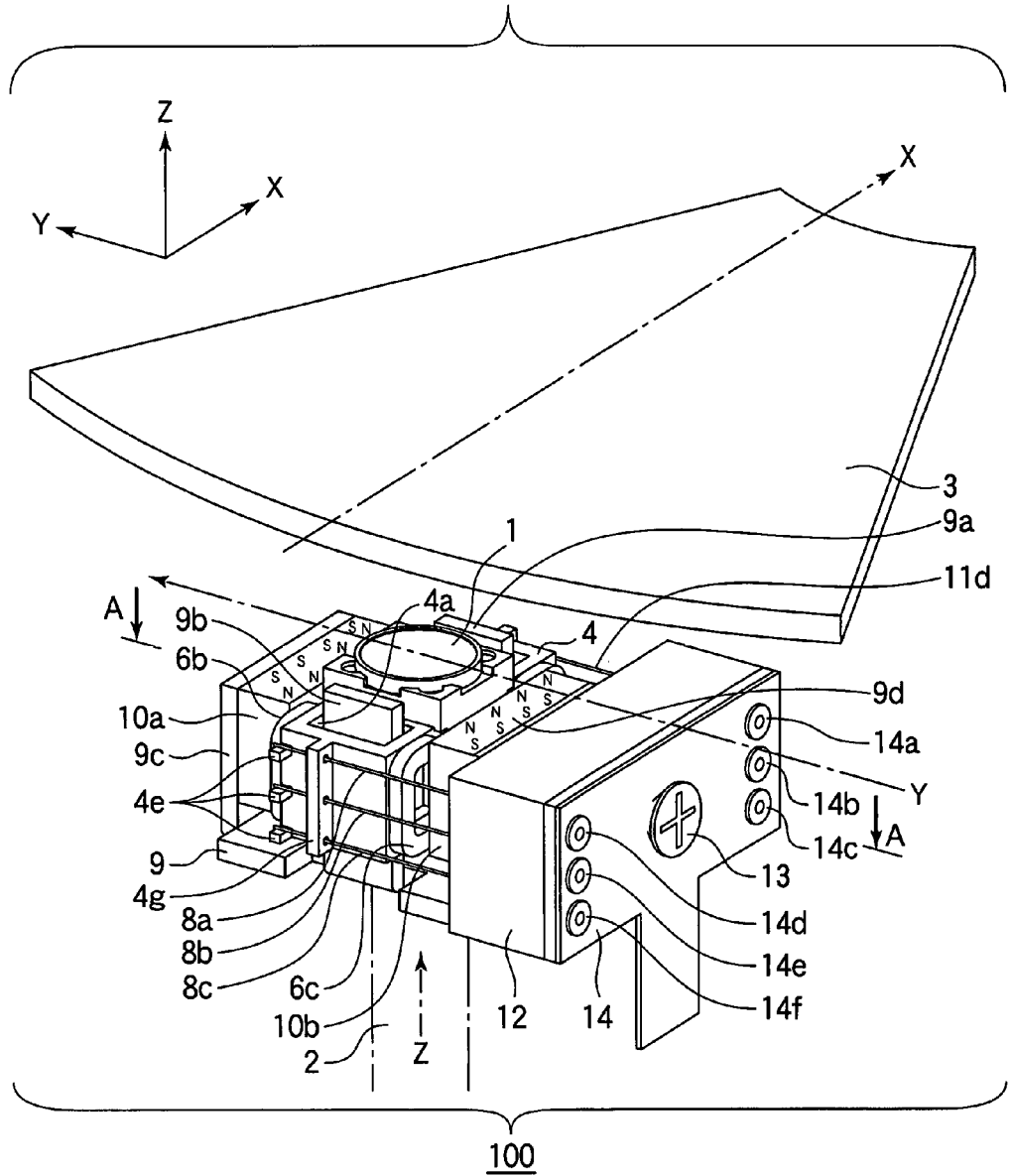
FIG. 1 is a perspective view showing an entire object lens driving apparatus according to Embodiment 1 of the present invention.
Figure 2:
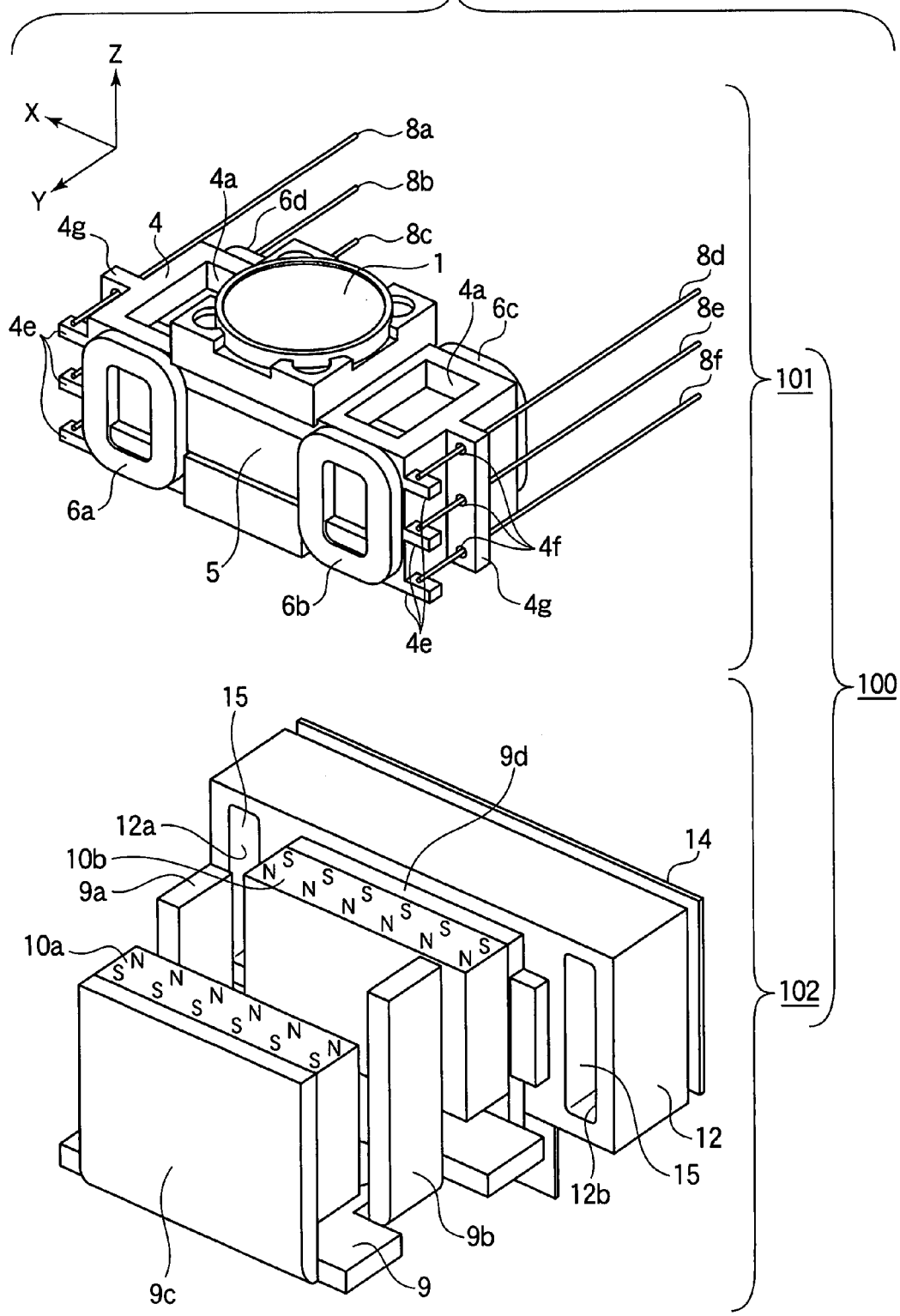
FIG. 2 is a perspective view showing the object lens driving apparatus in such a manner that a movable unit and a stationary unit are separated.

FIG. 1 is a perspective view showing an entire object lens driving apparatus 100 according to Embodiment 1 of the present invention together with a disk recording medium 3. FIG. 2 is a perspective view showing the object lens driving apparatus 100 in such a manner that the object lens driving apparatus 100 is divided into a movable unit 101 and a stationary unit 102. FIG. 3(*a*) is an exploded perspective view of the movable unit 101. FIG. 3(*b*) is a perspective view of a lens holder constituting the movable unit 101. FIG. 4 is an exploded perspective view showing a state where the movable unit 101 is being assembled. In a three-dimensional orthogonal coordinates system shown in FIGS. 1 through 4 and respective figures described later, an optical axis of an object lens 1 in an initial state is defined to be the Z-axis (parallel to the rotation axis of the disk recording medium 3). Along the Z-axis, the direction of the light proceeding toward the disk recording medium 3 is defined to be positive. In a plane perpendicular to the Z-axis, the direction from the Z-axis toward the rotation center of the disk recording medium 3 is defined to be the X-axis. The Y-axis is defined to be perpendicular to the Z-axis and the X-axis.

In FIG. 1, the object lens 1 mounted on the object lens driving apparatus 100 is for focusing the light flux 2 emitted by a light source 201 (FIG. 11) provided on the Z-axis onto the disk recording medium 3 in the form of a spot. The object lens 1 is fixed to a lens holder 4 by adhesion. The lens holder 4 is approximately in the form of a rectangular parallelepiped and is made of lightweight plastic having high stiffness.

As shown in FIG. 3(*b*), an aperture portion 4*b* is formed in the lens holder 4, which regulates the light flux 2 incident on the object lens 1. As shown in FIG. 3(*a*), a focusing coil 5 is provided in the interior of the lens holder 4 and fixed therein by adhesion so that the focusing coil 5 surrounds the optical axis of the object lens 1. Four tracking coils 6*a* through 6*d* and two tilt coils 7*a* and 7*b* are fixed to the outside of the lens holder 4 respectively by adhesion. The lens holder 4 and the respective coils 5, 6*a* through 6*d*, 7*a* and 7*b* constitute a movable unit 1. In FIGS. 1 and 2, the tilt coils 7*a* and 7*b* are in hidden positions.

As shown in FIG. 2, in the lens holder 4 of the movable unit 101, a pair of through holes 4*a* are formed in the direction of the Z-axis on both sides of the object lens 1 in the direction of the X-axis. The through holes 4*a* are for receiving inner yoke portions 9*a* and 9*b* (described later) of the stationary unit 102. The stationary unit 102 includes a base yoke 9 formed by pressing a magnetic material such as a cold rolling steel plate. On the base yoke 9, a pair of inner yoke portions 9*a* and 9*b* that face each other in the X direction and a pair of mounting walls 9*c* and 9*d* that face each other in the Y direction are formed integrally, and extend in the +Z direction. Two magnets 10*a* and 10*b* are fixed to the mounting walls 9*c* and 9*d*, and the magnets 10*a* and 10*b* are parallel-magnetized so that the same magnetic pole surfaces (N-pole surfaces shown in FIG. 2) face each other. The magnets 10*a* and 10*b* are disposed so that the magnets 10*a* and 10*b* approximately sandwich the inner yoke portions 9*a* and 9*b* in the Y direction. The base yoke 9 (including the inner yoke portions 9*a* and 9*b* and the mounting walls 9*c* and 9*d*) and the magnets 10*a* and 10*b* constitute a magnetic circuit that generates a static magnetic field.

As shown in FIGS. 1 and 2, when the movable unit 101 and the stationary unit 102 are combined to constitute the object lens driving apparatus 100, the inner yoke portions 9*a* and 9*b* of the stationary unit 102 penetrate the pair of through holes 4*a* of the movable unit 101. Then, three pairs of wires (conductive resilient bodies) 8*a* through 8*f* each having an end fixed to the stationary unit 102 are attached to the lens holder 4, so that the movable unit 101 is resiliently supported in cantilever fashion. By applying control current to the respective coils of the movable unit 101 resiliently supported in cantilever fashion on the stationary unit 102, the movable unit 101 moves toward and away from the surface of the recording medium 3 due to the interaction between the control current and the static magnetic field formed by the magnet circuit of the stationary unit 102, and the orientation of the movable unit 101 changes with respect to the surface of the recording medium 3. The control of the movement and the orientation of the movable unit 101 will be described later.

Here, the exploded perspective view of FIG. 3(*a*) illustrates a state before the focusing coil 5 is inserted into the interior of the lens holder 4 through an opening 4*c* as an insertion opening formed on an outer wall of the lens holder 4 supporting the object lens 1. Further, the perspective view of FIG. 3(*b*) illustrates the lens holder 4 as seen in a different direction so that the shape and position of the opening 4*c* as an insertion opening formed on the outer wall of the lens holder 4 can be understood. The exploded perspective view of FIG. 4 illustrates a state during the insertion of the focusing coil 5 into the interior of the lens holder 4 via the opening 4*c* of the lens holder 4.

As shown in FIGS. 3(*a*), 3(*b*) and 4, the focusing coil 5 has a winding axis in the direction of the optical axis of the object lens 1, and has an air-core structure in which the focusing coil 5 is disposed to surround the optical axis. At approximately the center of the lens holder 4 in the direction of the Z-axis, the rectangular opening 4*c* (FIG. 3(*b*)) connected to the aperture portion 4*b* is formed on one of outer walls parallel to the XZ-plane, and a focusing coil positioning wall 4*d* (FIG. 3(*a*)) is formed on the opposite outer wall. From the state shown in FIG. 3(*a*), the focusing coil 5 is inserted into the opening 4*c* in the direction of the Y-axis as shown in FIG. 4. When the focusing coil 5 is further inserted deeply, the focusing coil 5 abuts against the focusing coil positioning wall 4*d* and is positioned, and then the focusing coil 5 is fixed by adhesion.

Figure 5:
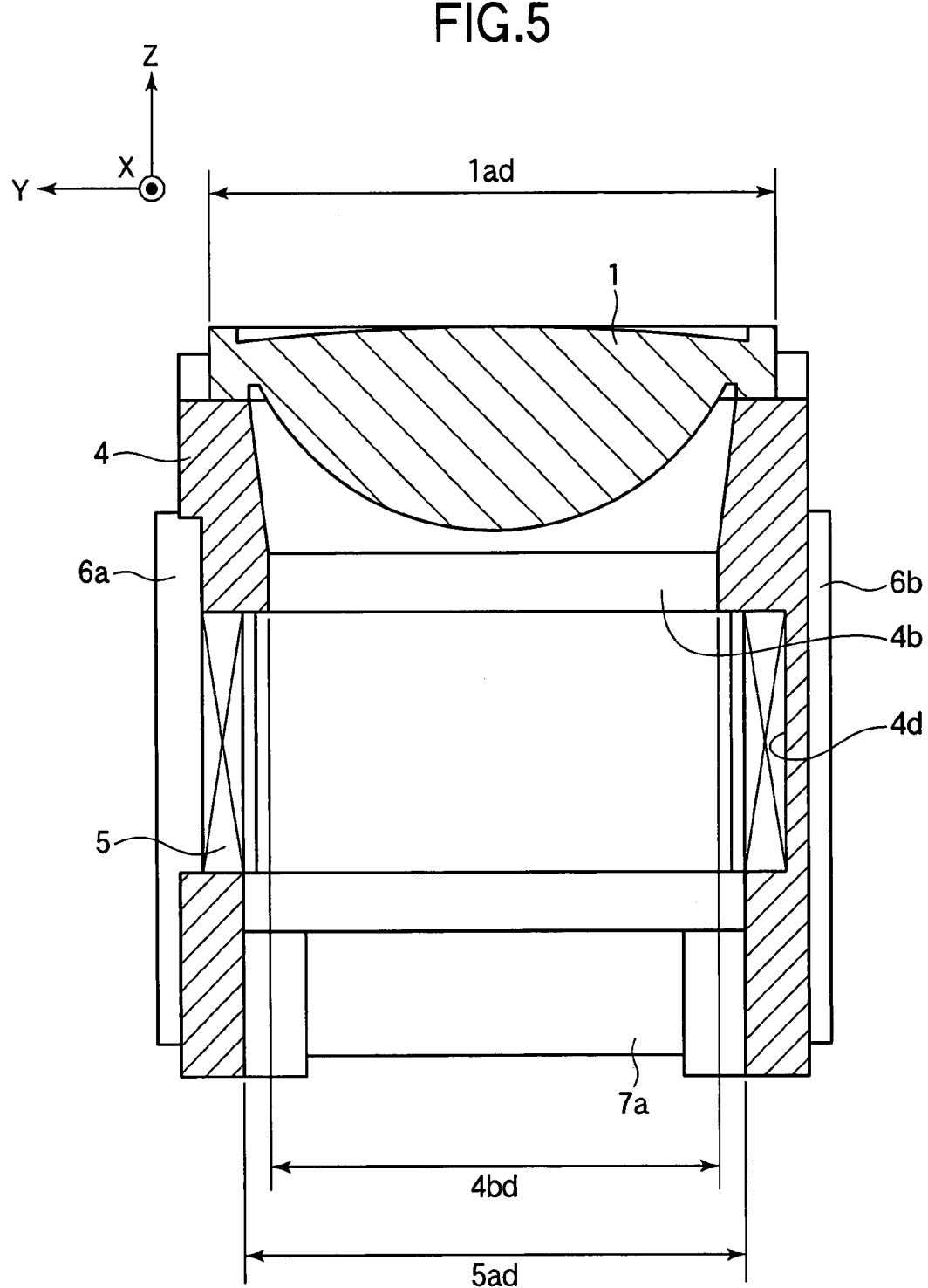
FIG. 5 is a sectional view showing the object lens driving apparatus of the movable unit taken along the cross section A-A shown in FIG. 1.
Figure 6:
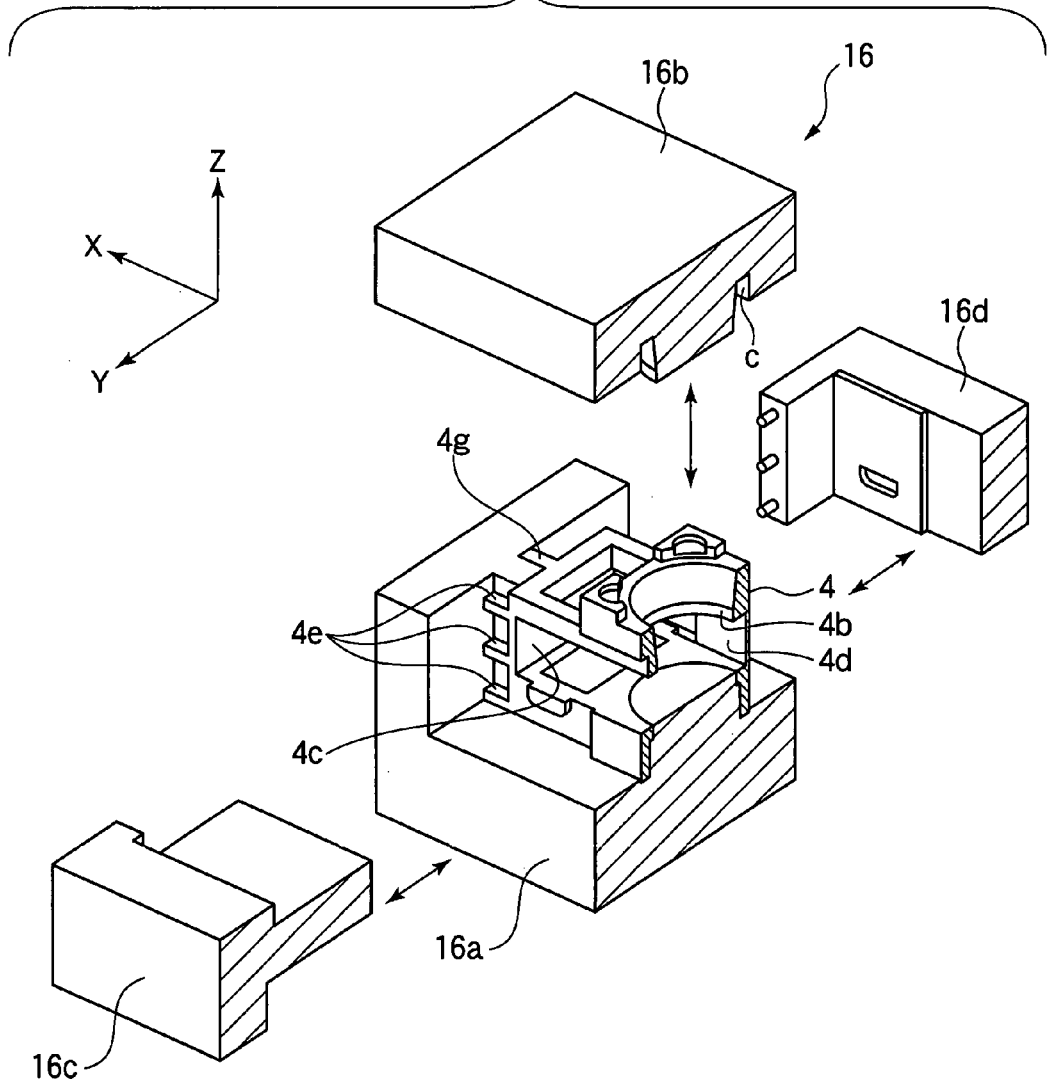
FIG. 6 is a sectional view showing a mold for forming the lens holder according to Embodiment 1 of the present invention cut along the cross section A-A shown in FIG. 1.

FIG. 5 is a sectional view taken along the cross section A-A shown in FIG. 1, illustrating the movable unit 101 in a state where the focusing coil 5 is inserted into the interior of the lens holder 4 through the opening 4*c* of the lens holder 4 and is fixed therein. FIG. 6 is a perspective view cut along the cross section A-A shown in FIG. 1, illustrating a mold 16 (a core 16*a*, a cavity 16*b* and slide cores 16*d* and 16*d*) for molding the lens holder 4 in a state where the lens holder 4 is set on the core 16*a*.

As shown in FIG. 5, the focusing coil 5 is fixed in such a manner that the focusing coil 5 abuts against the focusing coil positioning wall 4*d*. In the object lens driving apparatus 100 of Embodiment 1 of the present invention, an inner dimension 5*ad* of the focusing coil 5 in the direction of Y-axis is wider than an inner dimension (inner diameter) 4*bd* of the aperture portion 4*b* formed on the lens holder 4 for defining the light flux 2 (FIG. 1) incident on the object lens 1, and is narrower than an outer dimension (outer diameter) 1*ad* of the object lens 1. It is preferable in terms of the downsizing of the object lens driving apparatus 100 that the inner dimension 5*ad* of the focusing coil 5 is narrower than the outer dimension 1*ad* of the object lens 1. In this regard, the inner dimension 5*ad* of the focusing coil 5 can be narrower than or equal to the inner dimension 4bd of the aperture portion 4b. In this case, the focusing coil 5 itself is used as a substitute for the aperture portion 4b, and therefore there is an advantage that a smaller object lens driving apparatus 100 can be obtained. Further, the inner dimension 5ad of the focusing coil 5 can be wider than or equal to the outer dimension 1ad of the object lens. In this case, the dimension of the corresponding portion of the outer wall of the lens holder 4 facing the portion (wider than the outer dimension 1ad of the object lens) of the focusing coil 5 is just slightly wider than the outer dimension 1ad of the object lens 1.

Figure 3A:
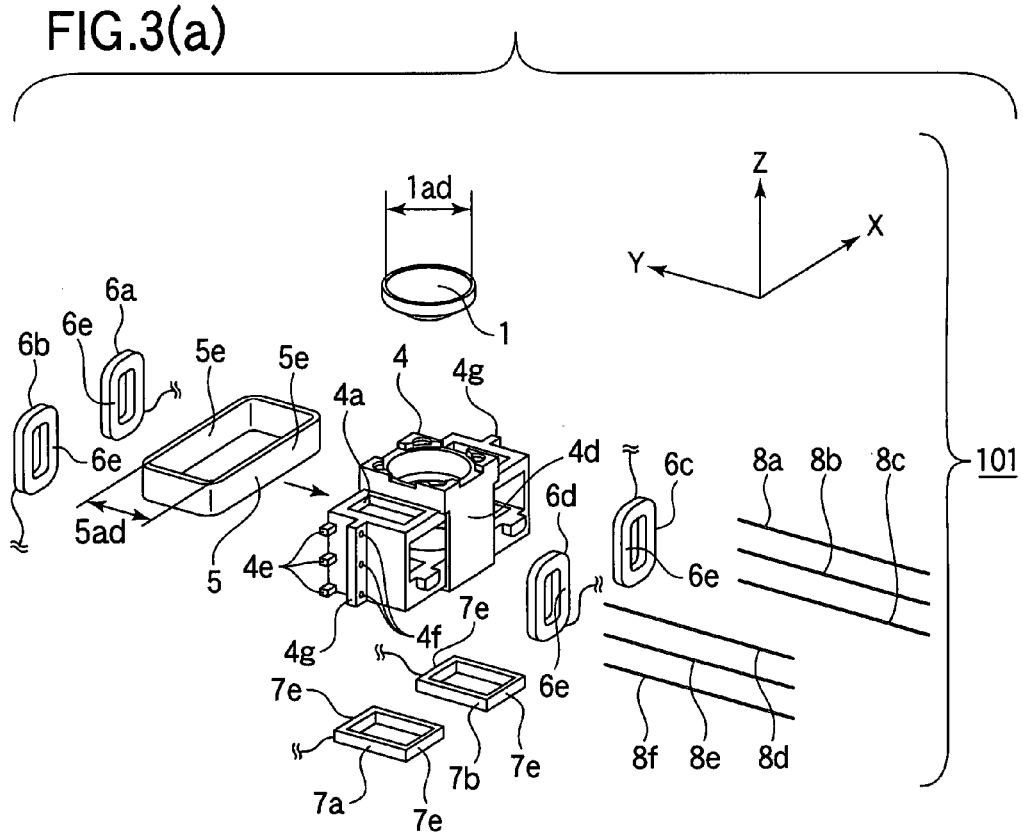
FIG. 3(a) is an exploded perspective view showing the movable part of the object lens driving apparatus according to Embodiment 1 of the present invention.
Figure 3B:
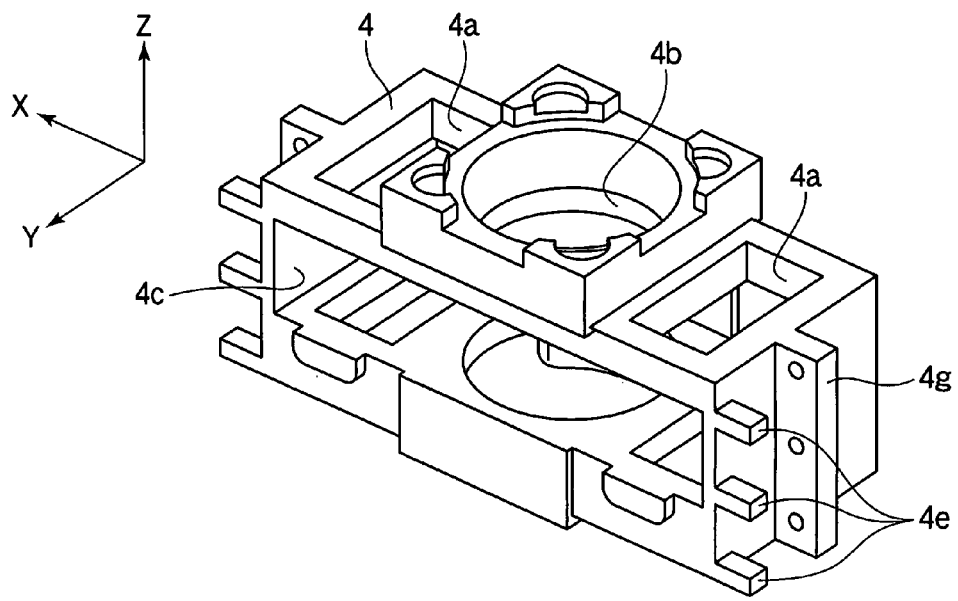
FIG. 3(b) is a perspective view of a lens holder of the movable unit.
Figure 4:
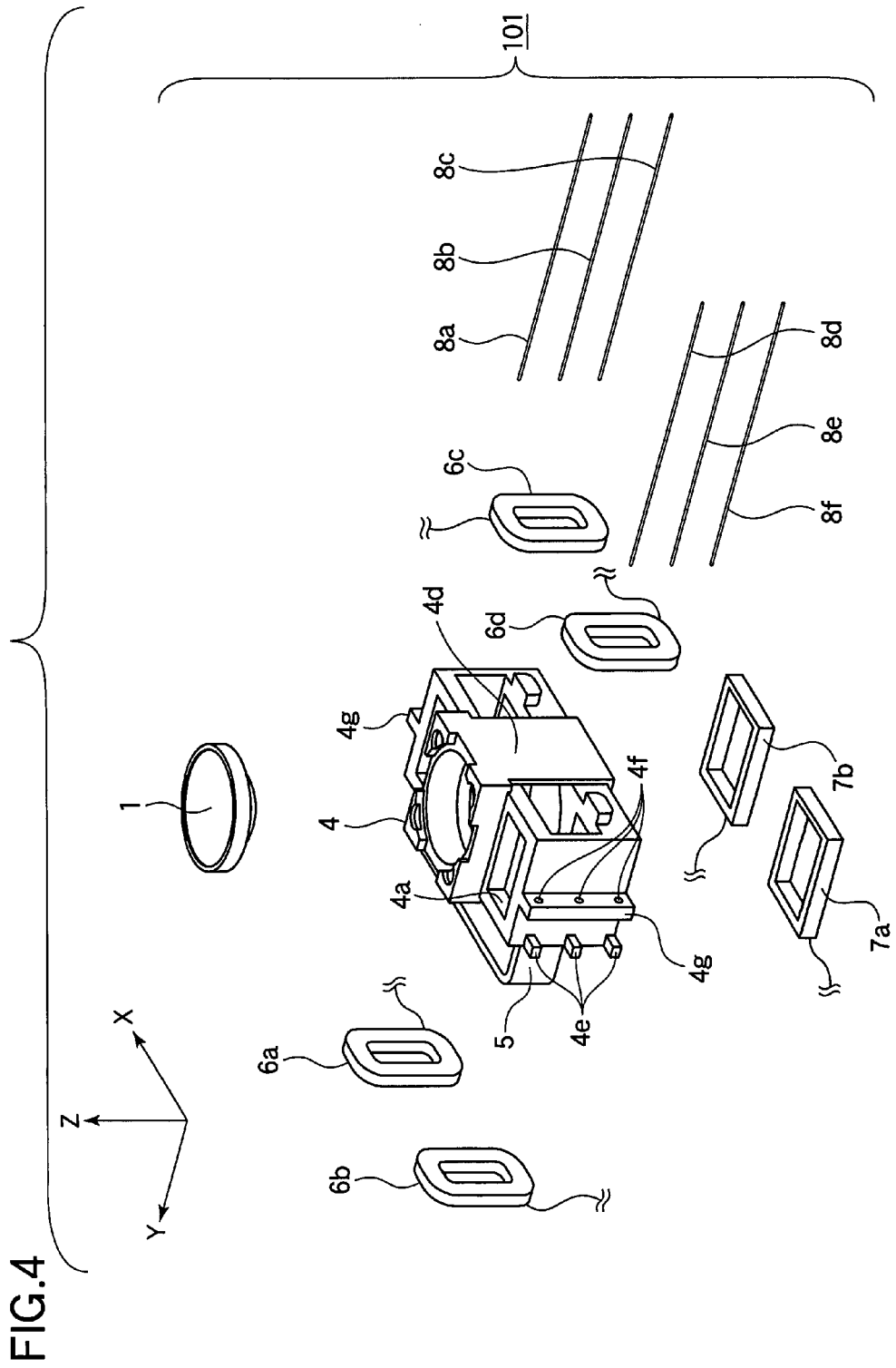
FIG. 4 is an exploded perspective view of the movable unit of the object lens driving apparatus according to Embodiment 1 of the present invention.

In FIGS. 3(a), 3(b) and 4, the tracking coils 6a, 6b, 6c and 6d are four electrically connected coils having winding axes in the direction of the Y-axis. The tracking coils 6a, 6b, 6c and 6d are fixed to the opposing X-Z surfaces of the lens holder 4 by adhesion, two on each surface. The tilt coils 7a and 7b are electrically connected coils having winding axes in the direction of the Z-axis. The tilt coils 7a and 7b are respectively fixed by adhesion to the outer wall (bottom) of the lens holder 4 parallel to the X-Y plane on the side opposite to the side to which the lens holder 1 is fixed. In order for the tilt coils 7a and 7b to generate electromagnetic forces in the opposite directions, the winding directions of the tilt coils 7a and 7b are opposite to each other. Three coil-end winding projections 4e as convex portions of solder (previously coated with solder) are formed at an end in the direction of the Y-axis of each of two outer walls parallel to the Y-Z plane on both ends of the lens holder 4 in the direction of the X-axis. A wire fixing wall 4g as a fixing portion is formed at the center portion in the direction of the Y-axis of each of two outer walls parallel to the Y-Z plane, and each wire fixing wall 4g has three wire fixing holes 4f. The winding end portions of the focusing coil 5, the tracking coils 6a through 6e and the tilt coils 7a and 7b are wound around the coil-end winding projections 4e, and adhere to connecting terminals by means of solder. The movable unit 101 is constituted as described above.

In FIGS. 2 and 3, two sides of the focusing coil 5 parallel to the X-Z plane that form longer sides of the focusing coil 5 (denoted by a numeral 5a in FIG. 3(a)), a side of each of the tracking coils 6a, 6b, 6c and 6d parallel to the X-Z plane (denoted by numeral 6e in FIG. 3(a)) and two sides of each of the tilt coils 7a and 7b parallel to the X-Z plane (denoted by numeral 7e in FIG. 3(a)) face the magnetic pole surfaces of the magnets 10a and 10b with gaps formed therebetween.

Next, the structure for supporting the movable unit 101 via the wires 8 so that the movable unit 101 is movable toward and away from the surface of the disk recording medium 3 (i.e., movable toward and away from the stationary unit 102) will be described. Linear wires (conductive resilient bodies) 8a, 8b, 8c, 8d, 9e and 8f having resiliency and electrical conductivity and composed of beryllium cupper or the like are fixed to the wire fixing holes 4f formed on the sides of the lens holder 4 constituting the movable unit 101, three on each of the right and left sides. An end of each of the wires 8a through 8f is electrically connected by soldering to the coil-end winding projection 4e made of solder to which the winding end of each of the focusing coil 5, the tracking coils 6a through 6d and the tilt coils 7a and 7b is connected. Further, as shown in FIG. 1, the other end of each of the wires 8a through 8f penetrates a gel holder 12 composed of plastic attached to the backside of the mounting wall 9d provided on the base yoke 9 for the magnet 10b, and is fixed by soldering to predetermined terminals 14a through 14f formed on a board 14. In this regard, the board 14 and the gel holder 12 are fixed to each other by screws 13.

With the above described structure, the focusing coil 5, the tracking coils 6a through 6d and the tilt coils 7a and 7b provided on the movable unit 101 are respectively electrically connected to the predetermined terminals 14a through 14f on the board 14. Further, the movable unit 101 is resiliently supported by the linear wires 8 in such a manner that the movable unit 101 is movable in the direction of the Z-axis and in the direction of the X-axis and is rotatable about a rotation axis in the direction of the Y-axis with respect to the board 14. A right-and-left pair of holes 12a and 12b are formed on the gel holder 12 through which the wires 8a through 8f penetrate. An ultraviolet-curable silicone-based gel-like damping agent 15 is filled in the holes 12a and 12b and is hardened (FIG. 2).

As shown in FIG. 6, a mold for forming the lens holder 4 is composed of the core 16a and the cavity 16b combined in the direction of the Z-axis, and slidable slide cores 16c and 16d combined in the direction of the Y-axis. A resin is injected into a space (a part of which is denoted by a symbol C) surrounded by the core 16a, the cavity 16b and the slide cores 16c and 16d, and is hardened so that the lens holder 4 is formed. The opening 4c and the aperture portion 4b of the lens holder 4 are connected to each other, and therefore the lens holder 4 can be formed as one molding article using the core 16a, the cavity 16b and the slide cores 16c and 16d.

Next, the operation of the object lens driving apparatus according to this embodiment will be described. In the case of controlling the focusing error of the light spot formed on the disk recording medium 3, a focusing control voltage is applied to the predetermined terminals provided on the board 14, to thereby apply current to the focusing coil 5 via predetermined two wires among the wires 8a through 8f. The interaction between the current and the static magnetic field formed by the magnets 10a and 10b generates an electromagnetic repulsive force in the direction of the Z-axis, so that the movable unit 101 moves in the direction of the Z-axis (the direction perpendicular to the disk recording medium 3). As a result, the object lens 1 moves toward and away from the disk recording medium 3, and the focusing control is performed.

In the case of controlling the tracking error of the light spot, a tracking control voltage is applied to the predetermined terminals of the board 14, to thereby apply current to the tracking coils 6a through 6d via predetermined two wires among the wires 8a through 8f. The interaction between the current and the static magnetic field formed by the magnets 10a and 10b generates an electromagnetic repulsive force, so that the movable unit 101 moves in the direction of the X-axis (the radial direction of the disk recording medium 3). As a result, the object lens 1 moves in the radial direction of the disk recording medium 3, and the tracking control is performed.

In the case of controlling the radial tilt of the light spot, a tilt control voltage is applied to the predetermined terminals of the board 14, to thereby apply current to the tilt coils 7a and 7b via predetermined two wires among the wires 8a through 8f (see FIG. 3(a)). The winding directions of the tilt coils 7a and 7b are opposite to each other, and therefore the interaction between the current flowing through the tilt coils 7a and 7b and the static magnetic field formed by the magnets 10a and 10b generates electromagnetic repulsive forces on the tilt coils 7a and 7b in the directions opposite to each other along the Z-axis. Therefore, a torque about an axis line in the direction of the Y-axis is generated, and the movable unit 101 rotates about the axis line in the direction of the Y-axis. As a result, the object lens 1 rotates about the axis line in the direction of the Y-axis, and the radial tilt control is performed.

In this regard, the radial tilt control is performed for the purpose as described below. If the optical axis of the object lens 1 is inclined with respect to the disk recording medium 3, an aberration (coma aberration) is generated, so that the shape of the light spot on the disk recording medium 3 is deformed, and the deterioration of the recording and reproducing properties occurs. As a countermeasure, it is necessary to detect the tilt of the disk recording medium 3 and to rotate the lens holder 4 so that the optical axis of the object lens 1 is perpendicular to the disk recoding medium 3. Therefore, the radial tilt control of the light spot is performed so that the optical axis of the object lens 1 is continuously perpendicular with respect to the tilt of the disk recording medium 3 in the radial direction (here, the direction of the X-axis).

Further, the movable unit 101 is resiliently supported by six wires 8a through 8f so that the movable unit 101 is movable in the direction of the X-axis, in the direction of the Y-axis and in the rotational direction about the Y-axis. Therefore, when the application of the current to the focusing coil 5 is stopped, the movable unit 101 returns to an initial position in the direction of the Z-axis (a moving reference position in the direction of the Z-axis). Further, when the application of the current to the tracking coils 6a through 6d is stopped, the movable unit 101 returns to an initial position in the direction of the X-axis (a moving reference position in the direction of the X-axis). Further, when the application of the current to the tilt coils 7a and 7b is stopped, the movable unit 101 returns to an initial position in the rotational direction about the Y-axis (a moving reference position in the rotational direction). Additionally, the six wires 8a through 8f penetrate the gel-like damping agent 15 filled in the gel holder 12, and therefore a damping effect on the movable unit 101 can be obtained. Therefore, excellent focusing control properties, tracking control properties and radial tilt control properties can be obtained, and unnecessary vibration is hardly transmitted from the outside to the movable unit 101.

As described above, the object lend driving apparatus 100 according to the Embodiment 1 supports the lens holder 4 (that holds the object lens 1 so that the object lens 1 faces the disk recording medium 3) so that the lens holder 4 is movable toward and away from the surface of the recording medium, and the focusing coil 5 is fixed in the interior of the lens holder 4 so that the focusing coil 5 surrounds the optical axis of the object lens 1. Therefore, the focusing coil 5 can be downsized, with the result that a small, light-weight and highly sensitive object lens driving apparatus 100 can be obtained.

Further, by providing the opening 4c on the outer wall of the lens holder 4 parallel to the optical axis of the object lens 1, the focusing coil 5 previously wound narrower than the width of the lens holder 4 can be inserted into the interior of the lens holder through the opening 4c and can be fixed therein. As a result, a small and highly sensitive object lens driving apparatus 100 can be obtained without requiring the exclusive and expensive direct coil-winding machine.

Further, when the focusing coil 5 wound narrower than the lens holder 4 is inserted into the interior of the lens holder 4 and fixed therein, the focusing coil 5 is inserted in the direction perpendicular to the optical axis of the object lens 1, and therefore it becomes easy to position the focusing coil 5 on fixing. As a result, the object lens driving apparatus 100 with high assembling accuracy can be obtained.

Further, the wires 8a through 8f are fixed by adhesion in the wire fixing holes 4f of the wire fixing walls 4g formed on the outer wall of the lens holder 4, the wires 8a through 8f are electrically connected to the winding ends of the respective coils at the projections 4e formed on the outer wall of the lens holder 4, and the focusing coil 5 is fixed in the interior of the lens holder 4 (FIG. 3(*a*)). Therefore, it is not necessary to use an exclusive and expensive direct coil-winding machine. Further, it is not necessary to provide a member separate from the lens holder 4 to perform the fixing and the electrical connection of the wires 8a through 8f. Therefore, it becomes possible to reduce the number of parts and the number of assembling steps. In this regard, it is also possible to use either the wire fixing walls 4g or the convex portions 4e.

Further, the focusing coil positioning wall 4d is provided on the outer wall of the lens holder 4 on the side opposite to the side on which the opening 4c is formed. Therefore, when the focusing coil 5 is to be inserted into the interior of the lens holder 4, the focusing coil 5 contacts and is stopped by the focusing coil positioning wall 4d, so that the positioning of the focusing coil 5 during the assembling becomes easy. Further, the weight of the coil positioning wall 4d and the weight of the solder fixed to the convex portion 4e can be balanced, and therefore the gravity center of the movable unit 101 can be aligned on the optical axis of the object lens 1. As a result, it becomes possible to obtain the controlling properties in which the unnecessary vibration is restricted.

Further, the inner dimension 5ad of the focusing coil 5 (having the air-core structure) in the direction of the Y-axis is wider than the inner dimension of the aperture portion 4b of the lens holder 4, and is narrower than the outer dimension 1ad of the object lens. Therefore, the dimension of the lens holder 4 in the direction of the Y-axis can be reduced, so that the size and weight of the movable unit 101 can be reduced. Further, the sides of the focusing coil 5 in the direction of the Y-axis that do not contribute to the driving become shorter, and therefore the use efficiency of the focusing coil 5 can be enhanced, so that the focusing driving force can be enhanced.

Further, the rectangular opening 4c of the lens holder 4 is connected to the aperture portion 4b, and therefore the mold 16 for forming the lens holder 4 can be constituted by the core 16a, the cavity 16b and the slide cores 16c and 16d as shown in FIG. 6. Therefore, it is possible to form the lens holder 4 as one molding article without dividing the lens holder 4 into two parts nor adding a separate component.

Embodiment 2

Figure 7:
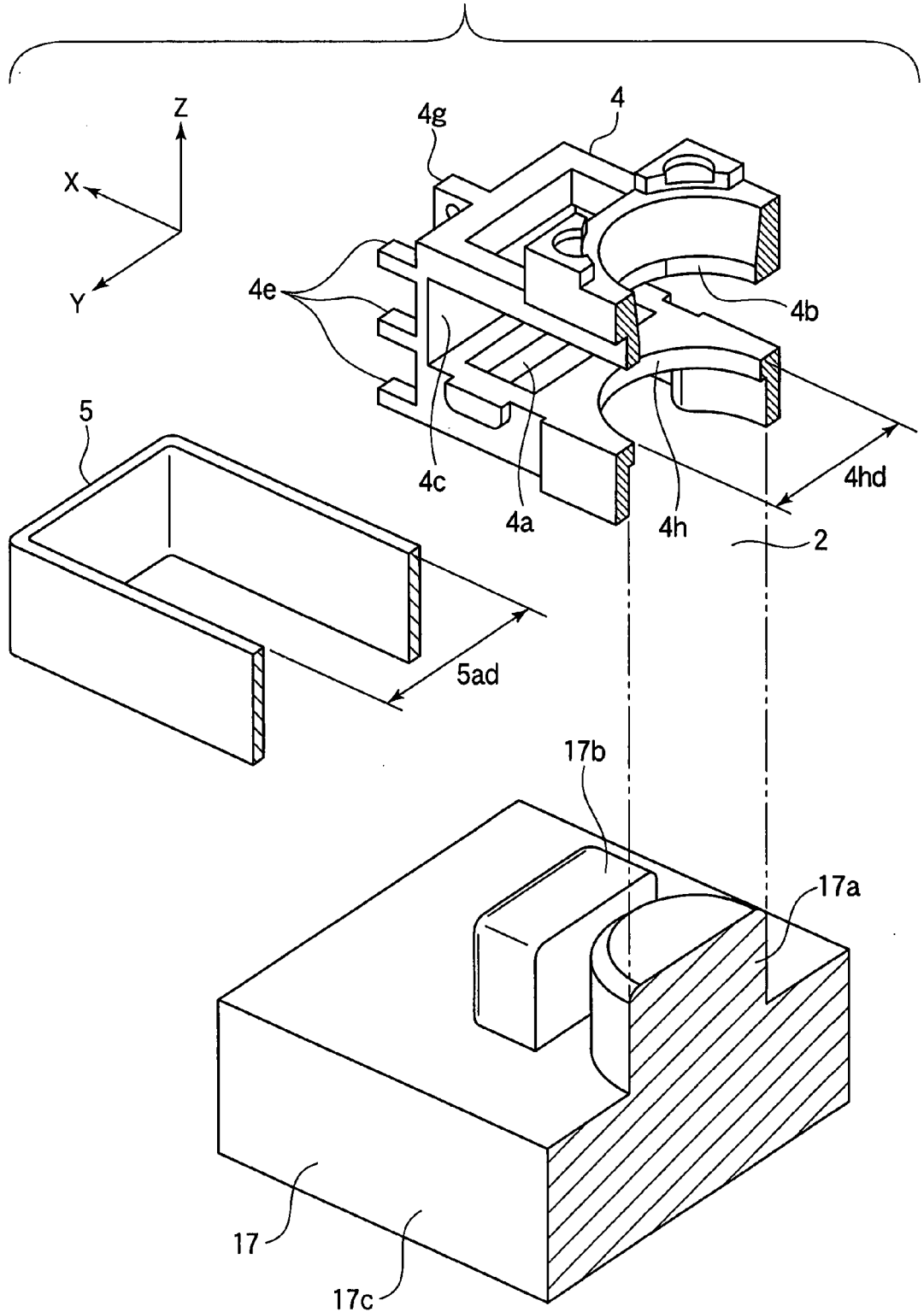
FIG. 7 is a sectional view showing a lens holder, a focusing coil and an assembling tool of an object lens driving apparatus according to Embodiment 2 of the present invention cut along the cross section A-A shown in FIG. 1.
Figure 8:
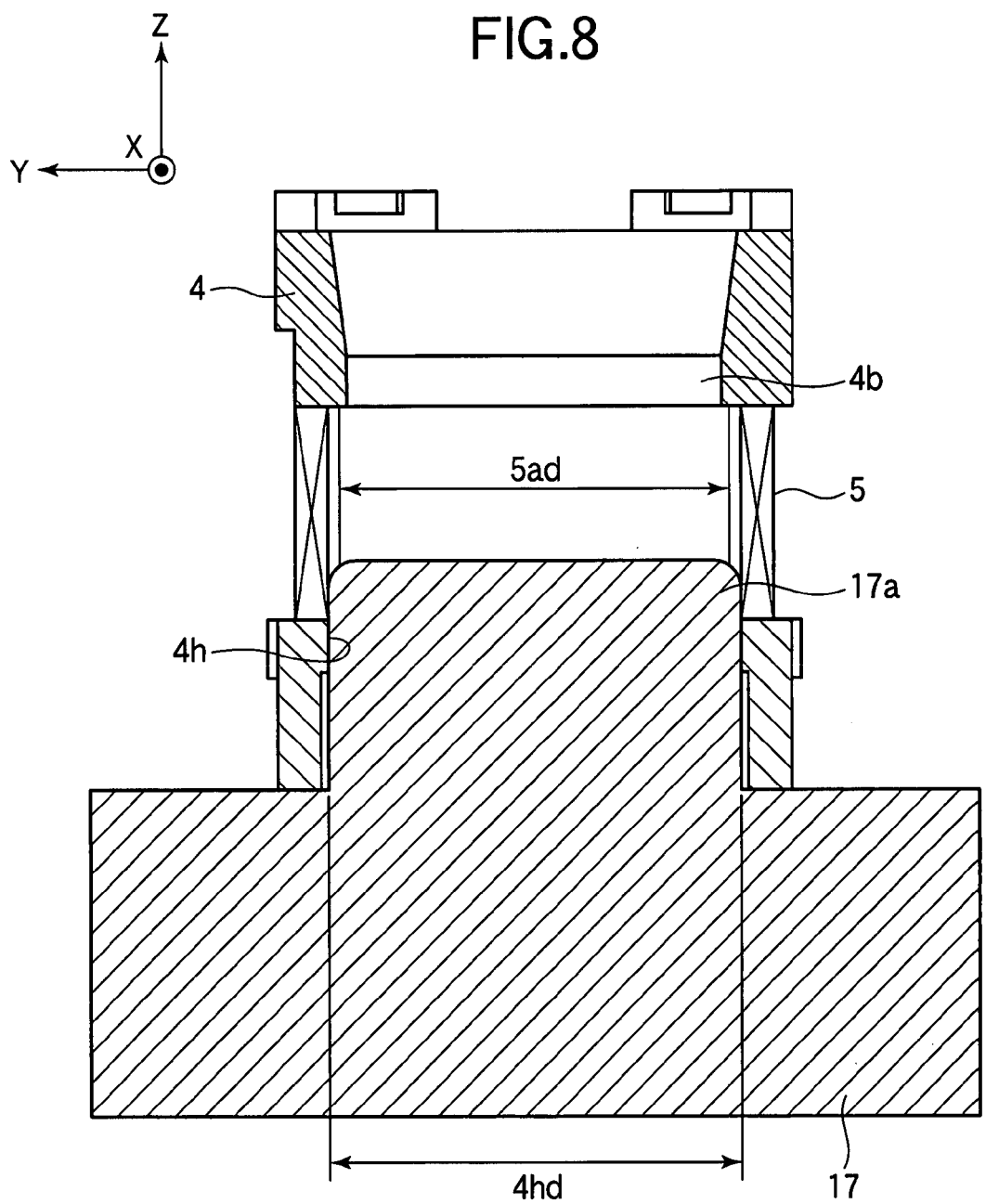
FIG. 8 is a sectional view showing the lens holder, the focusing coil and the assembling tool of the object lens driving apparatus according to Embodiment 2 of the present invention taken along the cross section A-A shown in FIG. 1.

Embodiment 2 of the present invention relates to a method for positioning the focusing coil 5 with respect to the lens holder 4 during the assembling of the object lens driving apparatus 100. FIG. 7 is a perspective view showing the lens holder 4 and the focusing coil 5 constituting the object lens driving apparatus and an assembling tool for accurately positioning the focusing coil 5 with respect to the lens holder 4, cut along the cross section A-A shown in FIG. 1. FIG. 8 is a sectional view corresponding to FIG. 7 taken along the cross section A-A shown in FIG. 1. In FIGS. 7 and 8, components that are the same as those shown in FIGS. 1 through 6 are assigned the same reference numerals.

As in Embodiment 1, the object lens 1 is provided for focusing the light flux 2 emitted by the light source onto the disk recording medium 3 to form the light spot. The object lens 1 is fixed by adhesion to the lens holder 4 formed of a light weight plastic having high stiffness approximately in the form of a rectangular parallelepiped. The focusing coil 5 has a winding axis in the direction of the optical axis of the object lens 1, and has an air-core structure approximately in the form of a rectangle in which the focusing coil 5 surrounds the optical axis. The inner dimension 5ad of the focusing coil 5 in the direction of the Y-axis is set wider than the inner dimension of an aperture portion 4b (for defining the light flux 2 incident on the object lens 1) formed on the lens holder 4, and narrower than the outer dimension 1ad of the object lens 1.

An opening 4c penetrates the outer wall of the lens holder 4 parallel to the X-Z plane so that the opening 4c is connected to the aperture portion 4b. A through hole 4h that reaches the opening 4c is formed on the outer wall (bottom) of the lens holder 4 parallel to the X-Y plane on the incident side of the light flux 2, and a pair of through holes 4a are formed on both sides of the through hole 4h in the direction of the X-axis. The inner dimension 4hd of the through hole 4h is approximately the same as the inner dimension 5ad of the focusing coil 5.

The assembling tool 17 includes a convex-shaped positioning portion 17a inserted into the through hole 4h of the lens holder 4, a pair of convex-shaped positioning portions 17b inserted into the through holes 4a of the lens holder 4, and a base 17c on which the positioning portions 17a and 17b are planted. The positioning portion 17a has an outer dimension slightly narrower than the inner dimension 4hd of the through hole 4h and the inner dimension 5ad of the focusing coil 5.

In this Embodiment, the focusing coil 5 is inserted into the opening 4c of the lens holder 4 in the direction of the Y-axis, and then the assembling tool 17 is moved in the direction of the Z-axis to insert the positioning portions 17a and 17b into the inside of the focusing coil 5 penetrating the through holes 4h and 4a. With this, as shown in FIG. 8, the focusing coil 5 can be positioned to a predetermined position in the lens holder 4. In this state, the focusing coil 5 is fixed to the lens holder 4 by adhesion. Then, the assembling tool 17 is removed from the lens holder 4. Other configuration and operation are the same as those of Embodiment 1.

In this Embodiment, by means of the assembling method using the assembling tool 17 as described above, it becomes possible to provide a reference inner diameter with which the dimensional accuracy can be easily ensured when the focusing coil 5 is mounted in the lens holder 4. Therefore, the fixing with higher positioning accuracy is enabled.

Embodiment 3

Figure 9:
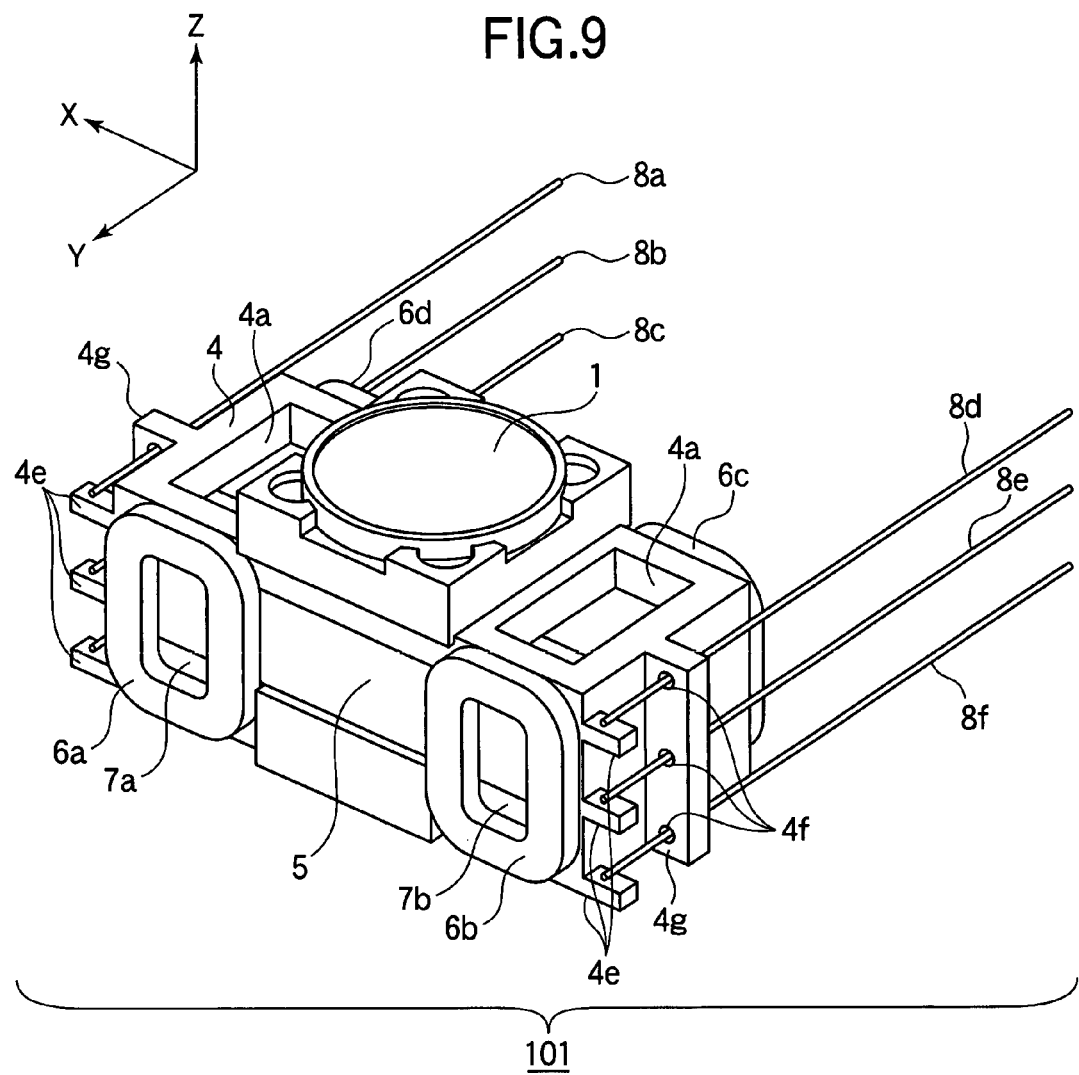
FIG. 9 is a perspective view of a movable part of an object lens driving apparatus according to Embodiment 3 of the present invention.
Figure 10:
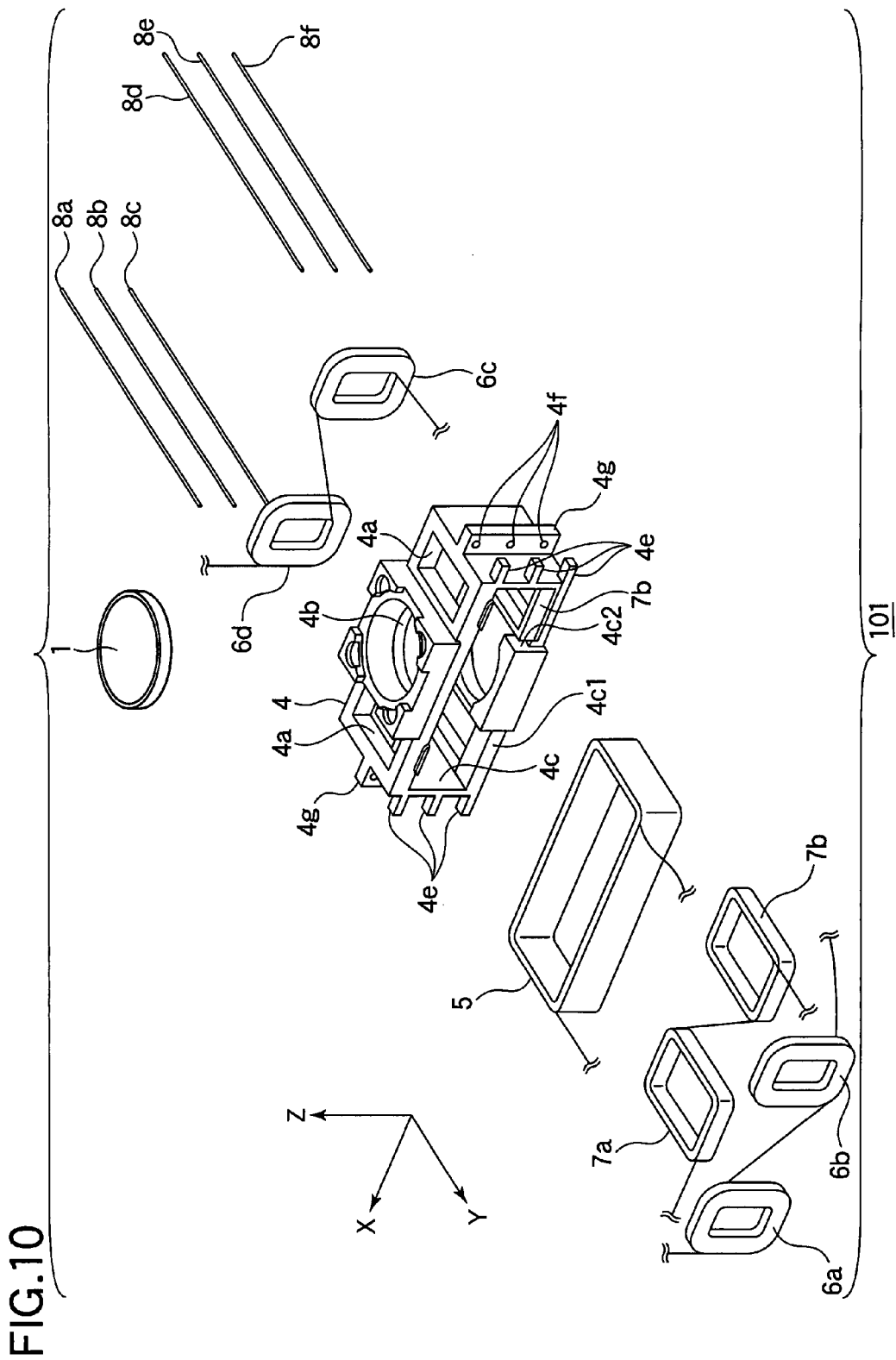
FIG. 10 is an exploded perspective view of the movable part of an object lens driving apparatus according to Embodiment 3 of the present invention.

FIGS. 9 and 10 are an assembling drawing and an exploded perspective view of an object lens driving apparatus according to Embodiment 3 of the present invention. In FIGS. 9 and 10, components that are the same as those shown in FIGS. 1 through 8 are assigned the same reference numerals.

As in Embodiment 1, the object lens 1 is provided for focusing the light flux 2 emitted by the light source onto the disk recording medium 3 to form the light spot. The object lens 1 is fixed by adhesion to the lens holder 4 formed of a light weight plastic having high stiffness approximately in the form of a rectangular parallelepiped. The focusing coil 5 has a winding axis in the direction of the optical axis of the object lens 1, and has an air-core structure approximately in the form of a rectangle in which the focusing coil 5 surrounds the optical axis. The inner dimension 5ad of the focusing coil 5 in the direction of the Y-axis is set wider than the inner dimension of the aperture portion 4b (for defining the light flux 2 incident on the object lens 1) formed on the lens holder 4, and narrower than the outer dimension 1ad of the object lens 1.

In this Embodiment, openings 4c1 and 4c2 are formed on the outer wall of the lens holder 4 parallel to the X-Z plane so that the openings 4c1 and 4c2 are connected to the opening 4c described in Embodiment 1 of the present invention. The openings 4c1 and 4c2 are positioned on the side (lower side in FIG. 10) opposite to the object-lens 1 with respect to the opening 4c in the direction of the Z-axis. The openings 4c1 and 4c2 are positioned on both sides of the lens holder 4 in the direction of the X-axis. The openings 4c1 and 4c2 are for inserting the tilt coils 7a and 7b into the interior of the lens holder 4.

A positioning wall 4d, which is the same as that in Embodiment 1, is formed on the side of the lens holder 4 opposite to the opening 4c (FIG. 3(a)). The focusing coil 5 is inserted in the opening 4c in the direction of the Y-axis, is positioned by contacting the positioning wall 4d, and is fixed by adhesion.

The tilt coils 7a and 7b are composed of a winding wire wound in directions opposite to each other, and have winding axes in the direction of the Z-axis. The tilt coils 7a and 7b are inserted in the direction of the Y-axis into two rectangular spaces formed between the focusing coil 5 and the lens holder 4 (lower side of the focusing coil 5 in FIG. 10) through the openings 4c1 and 4c2 of the lens holder 4, and is fixed by adhesion. The tracking coils 6a through 6d are composed of a winding wire continuously wound, and have winding axes in the direction of the Y-axis. The tracking coils 6a through 6d are fixed to the outer wall of the lens holder 4 parallel to he XZ-plane by adhesion, as in Embodiment 1. Other configuration and operation are the same as those of Embodiment 1.

With the above described structure, it becomes possible to mount the tilt coils 7a and 7b in the lens holder 4 in the direction of the Y-axis, as is the case with the focusing coil 5. Therefore, the operability of assembling and fixing can be enhanced, and further downsizing can be accomplished. Further, with the structure in which the focusing coil 5 and the tilt coils 7a and 7b are sandwiched by the lens holder 4 made of plastic having high stiffness, the adverse effect (the deformation of the coil) of the external mechanical force hardly occurs, and the movable unit 101 having higher stiffness can be accomplished.

In the above described Embodiments 1 and 2, the object lens driving apparatus that includes the focusing coil 5, the tracking coils 6 and the tilt coils 7 and six wires 8a through 8e and performs the focusing control, the tracking control and the radial tilt control have been described. However, the present invention is also applicable to, for example, an object lens driving apparatus that includes the focusing coil 5, the tracking coils 6 and four wires and performs the focusing control and the tracking control. Further, if necessary, the number of the wires (as the resilient bodies) can be 6 or more, and the wires can be replaced with a supporting body having the same effect.

Figure 11:
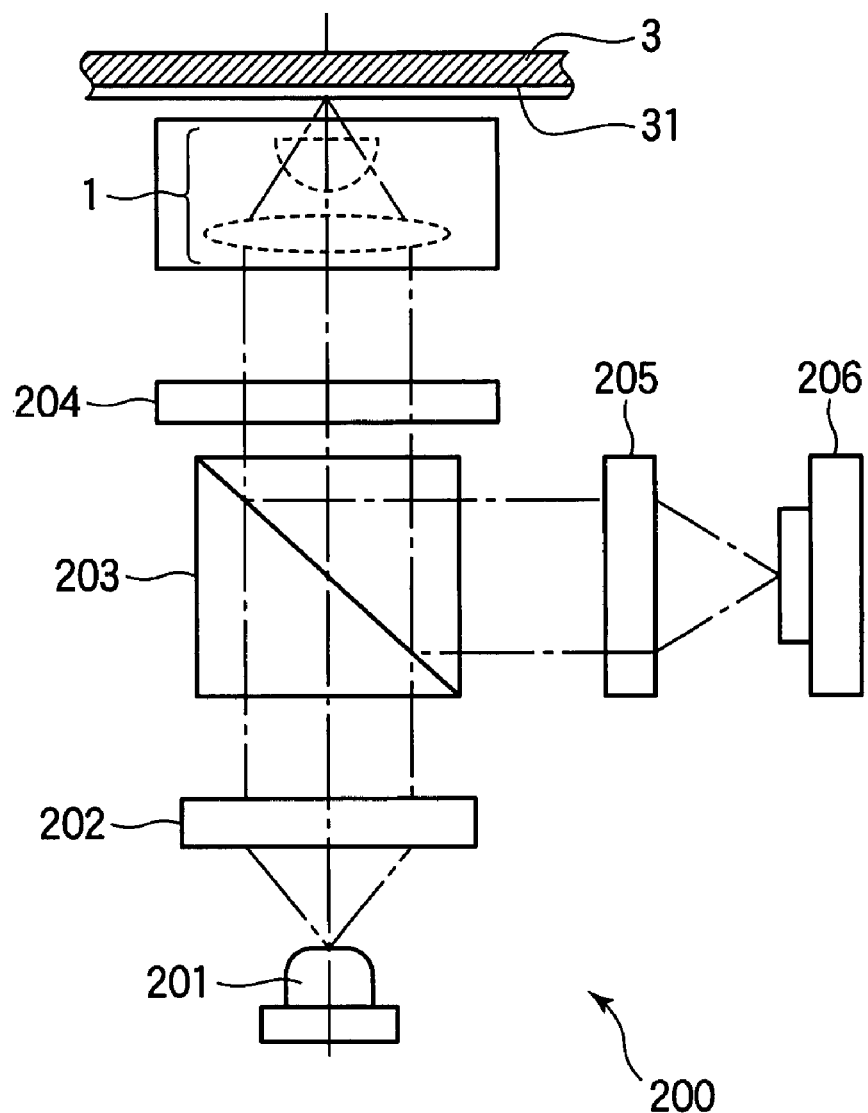
FIG. 11 is a schematic view showing an example of an optical system of the optical disk to which the object lens driving apparatus according to Embodiments 1 through 3 of the present invention is applied.

FIG. 11 is a schematic view showing a basic configuration of an optical head 200 to which the above described object lens driving apparatus according to Embodiment 1 through 3 are applicable. The optical head 200 includes a light source 201 such as, for example, a laser. In the direction of the emitted light from the light source 201, a first optical system (for example, a collimator lens) 202, a beam splitter 203, ¼ wavelength plate 204 and the object lens 1 are disposed. The object lens 1 is driven and controlled by the object lens driving apparatus according to embodiments 1 through 3, and the focusing control, the tracking control and the radial tilt control are performed. Additionally, in the direction of the reflected light from the beam splitter 203, a second optical system (for example, a collimator lens) 205 and a light detector (for example, a photo diode) 206 are disposed.

The light flux emitted by the light source 201 passes the first optical system 202, the beam splitter 203, the ¼ wavelength plate 204 and the object lens 1, further passes a protection film of the disk recording medium 3, and is focused onto a recording surface 31. The reflected light reflected by the recording surface 31 of the disk recording medium 3 passes the object lens 1 and the ¼ wavelength plate 204, is reflected by the beam splitter 203, passes the second optical system 205 and is focused onto the light detector 206. The light detector 206 takes the electric signal from the light intensity of the incident light (i.e., the reflected light from the recording surface 31), and reproduces the information.

As described in Embodiments 1 through 3, the object lens driving apparatus enables the fixing of the focusing coil in the interior of the lens holder while maintaining the high assembling accuracy, and therefore the downsizing of the object lens driving apparatus can be easily accomplished. Therefore, the small optical head can be accomplished by mounting the object lens driving apparatus of the present invention.

The invention claimed is:

1. An object lens driving apparatus comprising:
a lens holder so supported that said lens holder is movable toward and away from a surface of a recording medium, said lens holder holding an object lens so that said object lens faces said surface of said recording medium,
a focusing coil fixed in the interior of said lens holder so that said focusing coil surrounds an optical axis of said object lens, said focusing coil generating a driving force for moving said lens holder toward and away from said recording medium, and
an insertion opening formed on an outer wall of said lens holder parallel to said optical axis, said insertion opening being provided for inserting said focusing coil into said lens holder,
wherein said optical axis defines the Z-axis of an orthogonal X-Y-Z coordinate system, said lens holder and said focusing coil, as wound, each having a length running in the X direction and a width running in the Y direction in a plane parallel to the XY plane, the length and width of said focusing coil, as wound, being smaller than the length and width, respectively, of said lens holder.

2. The object lens driving apparatus according to claim 1, wherein said focusing coil is inserted through said insertion opening in a direction perpendicular to said optical axis and is fixed.

3. The object lens driving apparatus according to claim 1, wherein at least one of a fixing portion for fixing a conductive resilient body and a convex portion for electrically connecting a winding end of said focusing coil to said conductive resilient body is formed on an outer wall of said lens holder parallel to said optical axis.

4. The object lens driving apparatus according to claim 1, wherein a positioning means is provided on an outer wall of said lens holder on a side opposite to said insertion opening side.

5. The object lens driving apparatus according to claim 1, wherein an inner dimension of said focusing coil is smaller than an outer dimension of said object lens.

6. The object lens driving apparatus according to claim 1, wherein an aperture portion is formed in said lens holder and defines a light flux incident on said object lens, and
wherein said aperture portion is formed to be connected to said insertion opening.

7. The object lens driving apparatus according to claim 1, wherein a through hole is formed on an outer wall of said lens holder on an incident side of a light flux directed to said object lens, said through hole being formed in a direction parallel to said optical axis, and said through hole having an inner dimension approximately the same as an inner dimension of said focusing coil, and
said focusing coil is positioned on a predetermined position in the interior of said lens holder, by using an assembling tool having a convex-shaped positioning portion whose outer dimension is slightly smaller than an inner dimension of said through hole and an inner dimension of said focusing coil, and by inserting said positioning portion into the interior of said lens holder through said through hole.

8. The object lens driving apparatus according to claim 1, wherein a tracking coil for generating a driving force to drive said lens holder in a radial direction of said recording medium, and a tilt coil for generating a driving force to drive said lens holder in a direction to change a tilt with respect to said recording medium are fixed to said lens holder supported by a conductive resilient body.

9. The object lens driving apparatus according to claim 8, wherein said tilt coil is inserted into said lens holder through an insertion opening in a direction perpendicular to said optical axis and is fixed.

10. An optical head comprising said object lens driving apparatus according to claim 1.

11. An assembling method of an object lens driving apparatus, said object lens driving apparatus comprising: a lens holder so supported that said lens holder is movable toward and away from a surface of a recording medium, said lens holder holding an object lens so that said object lens faces said surface of said recording medium, and a focusing coil fixed in the interior of said lens holder so that said focusing coil surrounds an optical axis of said object lens, said focusing coil generating a driving force for moving said lens holder, wherein a through hole is formed on an outer wall of said lens holder on an incident side of a light flux directed to said object lens, said through hole being formed in a direction parallel to said optical axis, and said through hole having an inner dimension approximately the same as an inner dimension of said focusing coil, said assembling method comprising:
positioning said focusing coil on a predetermined position in the interior of said lens holder, by using an assembling tool having a convex-shaped positioning portion whose outer dimension is slightly smaller than an inner dimension of said through hole and an inner dimension of said focusing coil, and by inserting said positioning portion into the interior of said lens holder through said through hole.

* * * * *